United States Patent
Frankenstein et al.

(10) Patent No.: US 6,983,596 B2
(45) Date of Patent: Jan. 10, 2006

(54) CONTROLLED TURBOCHARGER WITH INTEGRATED BYPASS

(75) Inventors: Dirk Frankenstein, Worms (DE); Steve McKinley, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/494,409

(22) PCT Filed: Nov. 2, 2001

(86) PCT No.: PCT/US01/46323

§ 371 (c)(1),
(2), (4) Date: May 3, 2004

(87) PCT Pub. No.: WO03/044327

PCT Pub. Date: May 30, 2003

(65) Prior Publication Data

US 2004/0244373 A1    Dec. 9, 2004

(51) Int. Cl.
*F02D 23/00*    (2006.01)

(52) U.S. Cl. ........................ 60/602; 60/605.1
(58) Field of Classification Search .................. 60/602, 60/605.1, 605.2; 415/151
See application file for complete search history.

(56) References Cited

U.S. PATENT DOCUMENTS 4,395,884 A * 8/1983 Price ........................... 60/602
4,474,006 A * 10/1984 Price et al. ................... 60/602
4,526,004 A *  7/1985 French et al. ................ 60/602
4,544,326 A * 10/1985 Nishiguchi et al. ......... 415/151
4,565,068 A *  1/1986 Schneider .................... 60/602
5,146,754 A *  9/1992 Jain et al. .................... 60/602
5,943,864 A *  8/1999 Sumser et al. ............... 60/602

FOREIGN PATENT DOCUMENTS

DE            3735736         *  5/1989

* cited by examiner

*Primary Examiner*—Hoang Nguyen
(74) *Attorney, Agent, or Firm*—Pendorf & Cutliff; Greg Dziegielewski

(57) ABSTRACT

A rotary valve (1) particularly suitable for use in a turbocharger for an internal-combustion engine, the rotary valve provided between a turbocharger inlet port (10) and at least first and second scroll passages (13, 14), the rotary valve rotatable between (a) a position at which at least one scroll passage is blocked and a bypass outlet is blocked, (b) a position at which no scroll passage is blocked and the bypass outlet is blocked, and (c) a position at which no scroll passage is blocked and the bypass outlet is not blocked. The control valve is rotatable about a central axis, includes a disk-shaped base (2) and a control surface (4) provided upon said base, the control surface preferably being generally wedge shaped, and the disk optionally having an aperture (7) for communication with the bypass outlet. The rotary valve is preferably mounted on both sides via a shaft (112a, 112b) extending through the axis of rotation.

18 Claims, 5 Drawing Sheets

CONTROLLED TURBOCHARGER WITH INTEGRATED BYPASS

CROSS REFERENCE TO RELATED APPLICATION

This application is a national stage of PCT/US01/46323 filed Nov. 2, 2001 under the International Convention.

BACKGROUND OF THE INVENTION

1. Field of the Invention

The invention relates to a compact controlled twin-flow or dual-flow turbocharger, preferably twin-flow, having an integrated bypass. The invention more particularly concerns a turbocharger with an improved rotary valve design for regulating gas flow, including bypass.

2. Description of the Related Art

Reciprocating internal combustion engines have long been equipped with turbochargers. In a simple uncontrolled fixed-nozzle turbocharger system, the maximum charging pressure is a function of the strength of the engine. The uncontrolled turbocharger must thus be so designed that the optimal performance is reached only at high engine speeds. Unfortunately, at all other speed regions the turbocharger provides suboptimal boost or air volume.

Controlled turbochargers provide improved performance, in that the turbine optimal operating point is already reached at low or medium engine speeds. In a simple controlled system, when the flow rate of exhaust gases increases and the turbocharging pressure becomes too high, part of the exhaust gases are simply discharged into the surrounding atmosphere through a wastegate so as to bypass the turbine, whereby damage to the engine due to the excessive boost at high speeds can be avoided. However, since exhaust gases bypass the turbine, energy losses are high and the engine performance drops at high speeds.

Where there is sufficient engine compartment space it is known to install two turbochargers—a LP and an HP turbocharger—in series. At the lower speed range of the internal combustion engine the HP stage and LP stage are operated in series, and as the rotational speed of the internal combustion engine increases, a changeover can be made to single-stage compression exclusively in the low-pressure (large volume) compressor, partially or completely bypassing the high-pressure turbine. While such a system provides greatly improved efficiency, it lacks compactness.

It is also know to provide multiple flow conduits within a single turbocharger casing, such that the single turbocharger casing can be controlled to perform alternately as LP and as HP turbine. These casings can be classified into twin-flow casing (zwillingsstrom-gehaeuse) and dual-flow casing (doppelstromgehaeuse) type.

In a twin-flow casing the spiral turbine casing is divided by at least one radial partition into two axially adjacent spirals. The exhaust gas of each spiral enters the turbine wheel inlet to impact the entire periphery (360°) of the turbine wheel, with axially adjacent spiral conduits impacting axially adjacent segments of the turbine wheel.

In a dual-flow casing spirals or half spirals are so arranged that exhaust gas from each spiral acts upon the entire width of the turbine wheel inlet, but only over half the periphery (180°) of the turbine wheel.

The spiral selection or operation is controlled via a gate valve (throttle valve, flap, slide valve) which enlarges flow cross section with increasing supercharger speed. A control device is generally provided with sensing means for sensing boost pressure or speed, and an adjustment member for actuating the gate valve.

In addition to the above design considerations, turbochargers for multi-cylinder reciprocating internal combustion engines have to be designed to avoid exhaust interference. In order to overcome this problem, which occurs especially when the boost is lower than the exhaust gas pressure or the engine is partially loaded, supercharging systems are known in which the exhaust manifold to the turbine wheel is divided into two or more branches. The two exhaust gas lines are often brought from the cylinders of the engine to the spiral casing of the turbine, one group of cylinders, respectively, always being connected to an exhaust gas line in accordance with the firing sequence of the engine, so that cylinders in adjacent explosion order will not exhaust into the same branch and consequently exhaust interference can be avoided.

To utilize the energy contained in the exhaust gas optimally, each of the two exhaust gas flows should be conducted to the inlet of the turbine wheel with as little influence as possible being exerted thereon by the other. This should primarily avoid backfiring of the exhaust gas flow of either exhaust gas line, which arrives at the turbine and pulsates in dependence upon the opening times of the exhaust valves, into the other of the exhaust gas lines when no appreciable gas flow is flowing in the other exhaust gas line at the same time. The exhaust gas pulses should strike the turbine blades with full kinetic energy and, therefore, they must not encounter a large connected-line volume.

The same twin- or dual-flow casing designs discussed above can also be used specifically to avoid exhaust interference and take advantage of exhaust pulses. See U.S. Pat. No. 3,614,259 (Neff) teaching a divided turbine casing which may be used to provide either a pulse turbine or a variable speed turbine, with gas flow controlled via a flapper valve. In the case of an impulse turbine multiple exhaust gas lines are coupled to the turbine casing, thus the gate valve or flow control means must be of commensurate complexity, controlling flow through two or four or more flow paths.

See also U.S. Pat. No. 4,389,845 (Koike) teaching a triple flow turbine casing, wherein a control valve means is provided adjacent to first and second gas inlets (separated by a partition wall) so that the exhaust gases can flow only through first (double) scrolls or both through the first (double) scrolls and a second (single) scroll. The control valve means is operatively connected through a linkage to a control unit which consists of a diaphragm, which is deflected in response to the boost pressure, and a bias spring. In response to the boost pressure, the control valve means is so operated as to close or open the second scroll. More specifically, when the engine is running at low or medium speeds or is partially loaded, the flow rate of the exhaust gases is low so that the boost pressure is low. Therefore the control unit so operates as to close the second scroll. As a result, the exhaust gases flowd into the first scrolls only. Since the first scrolls are substantially separated from each other, no exhaust interference results. In addition, the pulsations of the exhaust gases can be utilized very effectively. When the second scroll is closed by the control valve means, the cross sectional area of the scroll structure is less than that when the second scroll is opened, so that the velocity of the exhaust gases flowing through the first scrolls is increased, whereby the sufficiently high boost pressure is attained. When the engine is running at high speeds, the flow rate of the exhaust gases increases, so that the control unit causes the control valve means to open the second scroll and, consequently, the overall cross sectional area of the scroll structure increases. The exhaust gases flowing from the separate gas inlets are mixed or diffused in the second scroll downstream of the control valve means. Since the second scroll exhibits less resistance to the flow of the exhaust gases, the boost pressure can be maintained at a predetermined level or magnitude.

As will be readily apparent from the above, turbine casings are relatively advanced with respect to the design of the channels for feed of exhaust gases from the internal combustion engine to the turbine. The present invention is not concerned with the turbine casing design. The above references teach the environment in which the present invention can be used, and this teaching is incorporated herein by reference.

The present invention is more specifically concerned with the control valve used within the casing for selection or operation of the flow spirals and/or enlargement or constriction of flow cross-section.

As illustrated in U.S. Pat. No. 4,389,845, the control valve may be a flap type valve (FIG. 6) or a slide type gate valve (FIG. 11). See U.S. Pat. No. 4,443,153 (Dibelius) and U.S. Pat. No. 4,351,154 (Richter) teaching dual exhaust manifolds, with each exhaust line subsequently divided into two or more conduits leading to the turbocharger. Flow is controlled via gate or flap valves.

An improvement in valve design can be seen in U.S. Pat. No. 4,544,326 (Nishiguchi et al.) which teaches, in addition to flapper type valves (FIG. 6A), a rotary valve (FIG. 8A, 9A, 10A, 11A, 13, 16). The rotary valve has a L-shaped cross section, as shown in FIG. 10B. The rotary valve has a solid segment portion whose cross sectional shape is a segment of a circle, and a circular end which has a circular disc shape and to which the shaft of the rotary valve is fixed. The rotary valve has one circular end only. The other side of the rotary valve is open. A cavity of the rotary valve is bounded by the circular end on one side, but the other side of the cavity is open. The open side of the cavity faces the partition wall of the turbine casing. The partition wall is formed with a hole. The hole opens into the cavity. In the closed position shown in FIG. 10A, the hole makes a fluid communication between a main scroll passage and a secondary scroll passage at a position upstream of the solid segment portion of the rotary valve. This fluid communication through the hole is maintained even in the valve open position. The hole can relieve dynamic pressure acting upon the cavity bottom when the valve is in the closed position.

This solid segment, whose cross sectional shape is a segment of a circle, is offset from the rotary valve cylinder center axis of rotation. Thus, any pressure applied to the solid segment causes the valve to be unbalanced, increasing the force required to rotate the valve between positions, reducing valve speed, and increasing the likelihood of valve sticking.

Further, in the case that there is a requirement to include a bypass function in the turbocharger, this is accomplished using additional control means, and adds to the space requirement and complexity. There is a need for a simpler and more efficient design for the bypass function.

SUMMARY OF THE INVENTION

The present invention was made based upon the discovery that a rotary valve can be designed with less hysteresis, more response, greater ease of control, and via which not only flow to scroll passages, but also a bypass function, can be controlled.

More specifically, a first embodiment of the present invention concerns a turbocharger comprising:

a turbine wheel;

a turbine casing defining a turbine wheel chamber having an inlet port and an outlet port, said turbine casing further including:

at least one casing inlet port for receiving exhaust gas, at least first and second scroll passages open toward an inlet port of a turbine wheel chamber and dimensioned for directing exhaust gas flow from said casing inlet port to said turbine wheel chamber, at least one upstream casing outlet upstream of said turbine wheel, at least one downstream casing outlet downstream of said turbine wheel for discharging exhaust gas from said turbine wheel chamber; and a rotary control valve provided between said casing inlet and said at least first and second scroll passages, said rotary control valve rotatable between (a) a position at which at least one scroll is blocked and said upstream casing outlet is blocked, (b) a position at which no scroll is blocked and said upstream casing outlet is blocked, and (c) a position at which no scroll are blocked and said upstream casing outlet is not blocked, wherein said control valve means is a rotary valve rotatable about a central axis, said valve including a disk-shaped base and a control surface provided upon said base, said control surface for selectively blocking at least one of said first and second scroll passages, said disk including an aperture which can be positioned in registry with said outlet upstream of said turbine wheel for permitting exhaust gas flow to bypass said turbine wheel.

The rotary valve control surface may be in the form of a wedge, a blunted wedge, a hyperbolic curve, or any shape other than a straight line. The control surface thus has a leading edge which extends over the axis of rotation of the rotary valve, and a trailing edge which is circular and adapted for moving with close tolerance to the spiral channel inlet openings.

In a second embodiment, the bypass or wastegate is not controlled via an aperture in the disk part of the rotary valve, but rather by the control surface of the rotary valve. Since this control surface must perform an additional function, the control surface must be made wider, which (a) increases the size of the rotary valve and (b) requires placemen of the bypass outlet on the same plane as the first and second scroll passages, which may result in an increased overall size of the turbine casing.

In a preferred variant of the first and second embodiments, not only is the rotary valve journaled at the shaft between base disk and control arm, but also on the upper end of the rotary valve. Such a dual journaling results in a greater precision in the guidance of the valve. This in turn makes it possible to manufacture the valve with closer tolerances (e.g., using a gap optimization technique using abrasive surface layers in the piston seal and bypass channel), which in turn results in less bypass leakage and greater efficiency, and also in the ability to reduce the size of the valve.

The rotary part of the rotary valve can be interchanged with other rotary parts of different design, for easily changing flow characteristics.

There are no striking surfaces, no repeated striking, and therefore in comparison to standard variable sliding valves the service life is significantly extended. There is no stress on the turbine casing, as with conventional slide valves.

Since the power required to adjust the valve is less due to the purely rotational movement, and thus the actuator can be made smaller without fear of jamming.

Since the friction is limited to the bearings, and is thus low, there is hardly any hysteresis, and therefore the control characteristics are noticeably improved.

The rotary valve may be mounted on one side (a floating valve) or on both sides (double sided) for greater guidance precision and for reduced vibration characteristics.

The working surfaces are simple and easy to machine, thus the manufacturing process is uncomplicated and economical. In fact, side seals may be dispensed with or may be optionally employed. The thermodynamic characteristics were also found to be improved. The rotary valve is particularly suitable for production in high numbers.

Overall, the parts could be made smaller, lighter, with closer tolerances, more economically, and taking less space than conventional slide or rotary valves.

The foregoing has outlined rather broadly the more pertinent and important features of the present invention in order that the detailed description of the invention that follows may be better understood, and so that the present contribution to the art can be more fully appreciated. Additional features of the invention will be described hereinafter, which form the subject of the claims of the invention. It should be appreciated by those skilled in the art that the conception and the specific embodiments disclosed may be readily utilized as a basis for modifying or designing other devices comprising rotary valves for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

Preferred embodiments of the invention are explained in the following sections with reference to the attached drawings, wherein.

DETAILED DESCRIPTION OF THE INVENTION

The present invention concerns a rotary valve design, and will be described herein in the context of a turbocharger wherein exhaust gases from an engine flow through an exhaust pipe to a turbine where pressure energy, velocity energy and thermal energy are converted into torque at the turbine shaft. This torque is transmitted to a compressor which spins and discharges compressed air through an intake passage to the engine.

As discussed in detail in the introductory portion of the specification, it is well known to design into turbocharger casings multiple flow paths of different characteristic—in general at least one larger passage scroll and one smaller passage scroll separated by a separating wall—and in which the exhaust gases from the engine are selectively channeled. Both of the larger and smaller passages are open toward an inlet port of a turbine wheel chamber containing of the turbine wheel. These housing designs are incidental to the present invention, and need not be discussed in great detail herein. When the rotary valve of the present invention is provided between a turbocharger exhaust gas inlet and the turbine wheel, it is used for controlling or directing exhaust gas flow along the various channels, and as such provides improvements in efficiency and compactness, discussed in greater detail below. Accordingly, when used in a turbocharger, the rotary valve of the present invention is not limited to any particular class or design of turbine casing, and may be used in any dual flow, twin flow, or impulse type housing, or combinations thereof.

Suitable turbine casing designs can be found for example in U.S. Pat. No. 3,614,259 (Neff); U.S. Pat. No. 4,389,845 (Koike); U.S. Pat. No. 4,443,153 (Dibelius); U.S. Pat. No. 4,351,154 (Richter); and U.S. Pat. No. 4,544,326 (Nishiguchi), the teachings of which are incorporated herein by reference.

Sensors, control logic and actuators for moving the rotary valve are also well known, as exemplified by the above listed US patents, and thus need not be discussed in detail herein. Linked to a motor electronic system, which records the operating characteristics of the engine, such as rotational speeds, mass flows, turbocharging pressures and turbocharging air temperatures, the rotary valve can be controlled for a mode of operation that minimizes consumption or minimizes pollutants at any operating point of the engine. As a rule, a trade-off is required between minimal consumption and minimal pollutants. Depending on the ambient conditions, load state and rotational speed, a target-optimized splitting of the exhaust mass flow is made to the bypass side (which may be a waste gate or may be connected directly to a catalytic converter), the turbine first flow channel and the turbine second flow channel and, if additional flow channels are provided, then to the additional flow channels.

Figure 1:
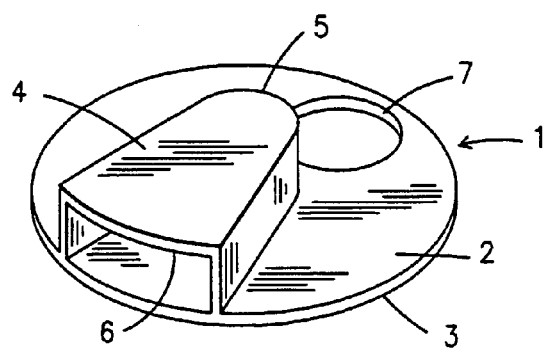
FIG. 1 shows the rotary component of the rotary valve for use in a first embodiment of the invention.

Turning now to the figures, FIG. 1 shows the rotary component 1 of the rotary valve for use in a first embodiment of the invention. Base disk 2 is defined by a circular outer peripheral edge 3, and has an aperture 7 defined therein. Provided on one surface of the base disk is a control surface 4, shown in the figure as having a wedge shape with a blunted leading edge 5 and an arcuate trailing edge 6 concentric with the disk peripheral edge. The rotary valve axis of rotation passes behind the leading edge of the guide surface.

Figure 2:
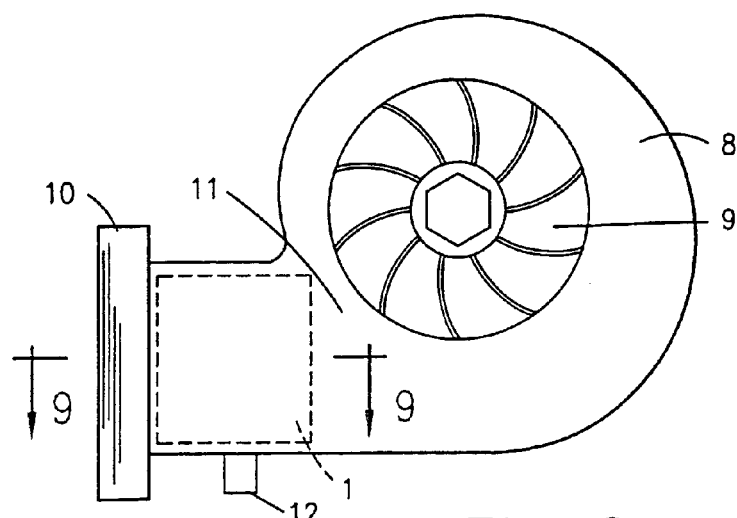
FIG. 2 shows the position of the rotary valve within a generic turbocharger casing.

FIG. 2 shows the placement of the rotary guide valve within a generic turbine housing 8. The rotary valve 1 is provided in the turbine throat 11 downstream of a mounting flange 10 and upstream of the turbine wheel 9. The rotary valve is mounted for rotation about shaft 12.

Figure 3:
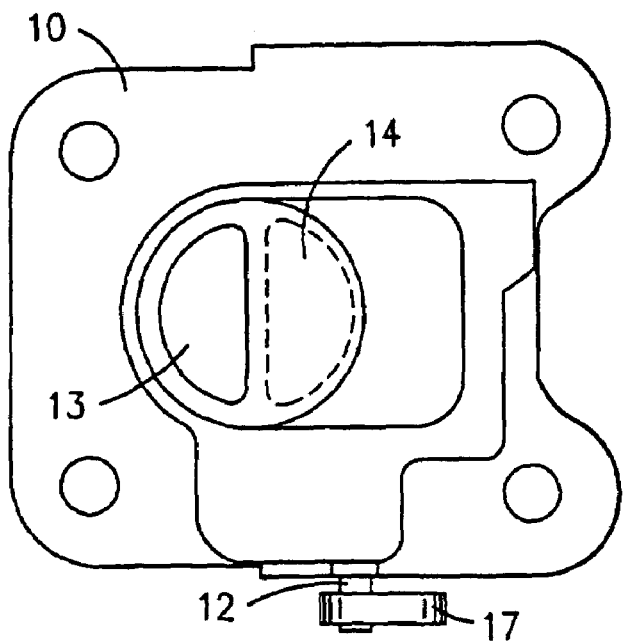
FIG. 3 is a view onto the mounting flange of the turbocharger.

FIG. 3 is a view looking onto the mounting flange of the turbocharger, from which an outer (generally but not necessarily smaller) spiral 13 and inner (generally larger) spiral 14 can be seen, as well as a guide arm 17 via which the actuator (not shown) moves the rotary valve.

Figure 4:
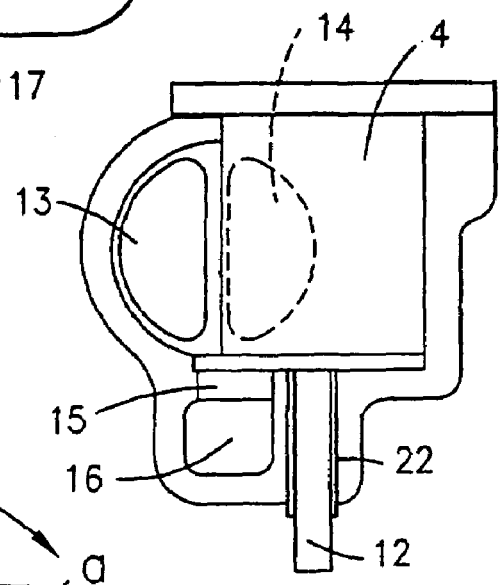
FIG. 4 corresponds to FIG. 3, and is a cross section through the rotary valve.

FIG. 4 corresponds to FIG. 3, and is a cross section through the rotary valve port of the turbocharger. Shown here is a single bushing 22 for mounting the elongate shaft 12 of the rotary valve 1. Also shown is bypass channel 16 and a through-hole in the turbine housing floor below the rotary valve, which can be in registry with the rotary valve disk aperture when the rotary valve is in position "c" discussed below.

Figure 5:
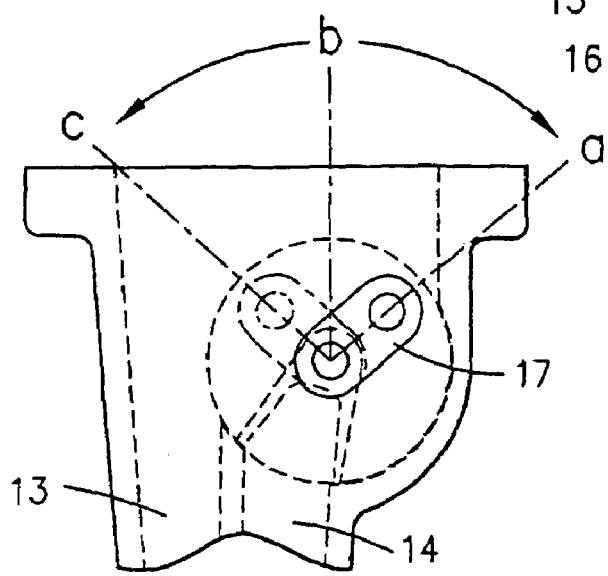
FIG. 5 is a view from the bottom of the turbocharger throat area, indicating control arm in positions a–c.
Figure 6:
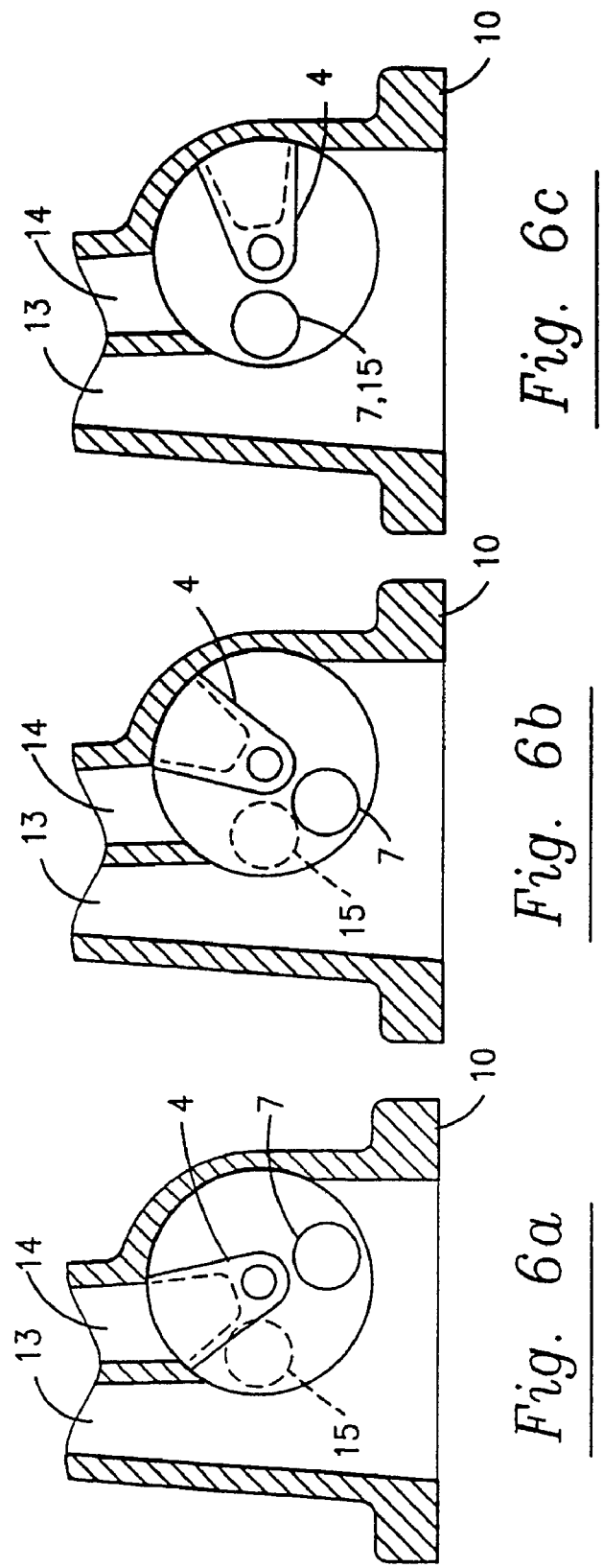
FIGS. 6a–c show rotary valve and aperture in positions a–c corresponding to control arm positions a–c, respectively.

FIG. 5 is a bottom view of the throat part of the turbocharger housing, showing guide arm 17 in two end positions, and moveable to positions "a", "b" and "c", the relevancy of which can be better understood from FIGS. 6a–c.

FIG. 6a shows rotary valve (including disk aperture) in position "a", corresponding to control arm position "a" of FIG. 5. When the flow rate of the exhaust gases is low, the rotary valve is positioned with control surface 4 blocking inner scroll 14, so that the exhaust gases flow only through outer scroll 13. The overall cross sectional area of the outer scroll structure is small, so that the velocity of the exhaust gases flowing through the outer scroll is increased. In a preferred embodiment (not shown) the outer scroll may be divided, substantially separated by a partition wall, so that pulsations of the exhaust gases can be utilized at high efficiency and consequently a sufficiently high boost pressure can be insured even at low speeds.

When the flow rate of the exhaust gases increases, an actuator (not shown) so operates as to cause the rotary valve 1 to open not only the outer scroll (or scrolls) 13 but also the inner scroll 14. As a result, the volume of the turbine casing 8 is increased so that the velocity of the exhaust gases decreases and consequently the boost pressure can be maintained at a predetermined level.

When the speed of the engine further increases, the flow rate of the exhaust gases increases accordingly so that the actuator causes the rotary valve 1 to open not only the outer and inner scrolls but to position the disk aperture 7 in registry with a through-hole 15 extending through a wall leading to exhaust gas bypass channel 16 designed as a waste gate or for recirculation. As a result, part of the exhaust gas from the engine is discharged into the surrounding atmosphere so that the boost pressure can be prevented from rising excessively and maintained at an optimum level.

In summary, inner and outer scrolls and the exhaust bypass aperture are selectively opened or closed in response to the flow rate of the exhaust gases from the engine so that, regardless of the variations in flow rate, the desired turbine characteristics can be maintained.

Figure 7:
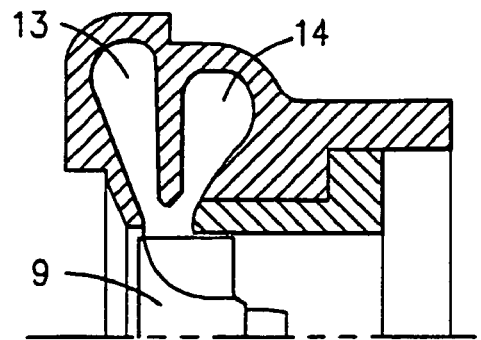
FIG. 7 is an axial longitudinal section through the turbocharger casing showing first and second exhaust gas flow channels.

FIG. 7 is an axial longitudinal section through the turbocharger casing showing first and second exhaust gas flow channels, which may be of any design, configuration, and complexity, twin flow, dual flow, and multi-channel twin flow or dual flow as would be optimal for controlled impulse type turbocharger casing. The flow channels may extend radially and be axially adjacent as shown here, or may be inner and outer as in a dual flow design.

Figure 8:
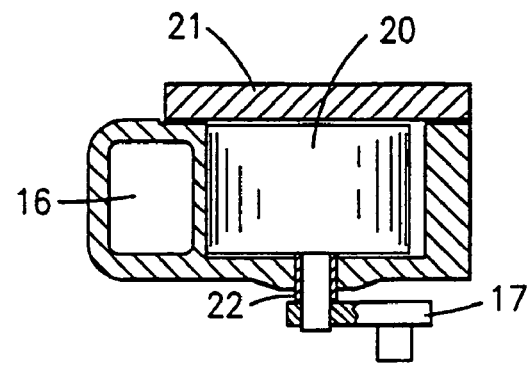
FIGS. 8 and 9 represent side and top cross-sectional views of a second embodiment of the invention, with exhaust gas bypass channel arranged beside the rotary valve rather than below the rotary valve.
Figure 9:
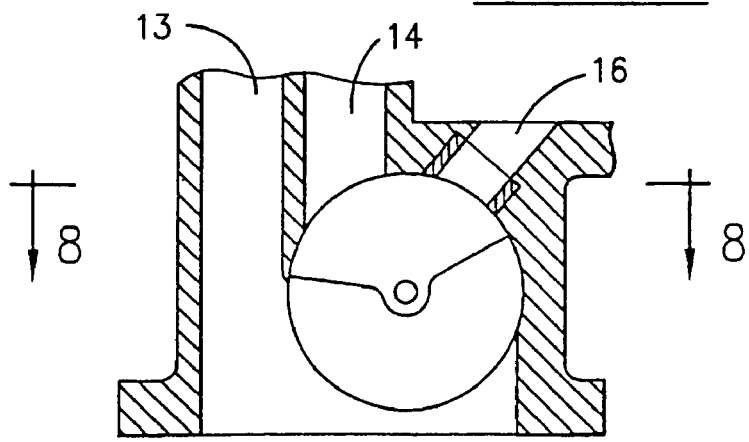

FIGS. 8 and 9 represent side and top cross-sectional views of a second embodiment of the invention, with exhaust gas bypass channel arranged beside the rotary valve rather than below the rotary valve. The advantage of such a design is that the rotary valve is "flatter and wider" which may be desired in certain engine compartments. The rotary valve shaft is again mounted via a single bearing 22. The rotary valve can be easily accessed by removal of a lid part. In the rotary valve position shown in FIG. 9, the inner scroll 14 and bypass channel 16 are blocked. By rotating the rotary valve clockwise, first inner scroll 14 becomes open, and upon further rotation bypass channel 16 becomes open.

Figure 10:
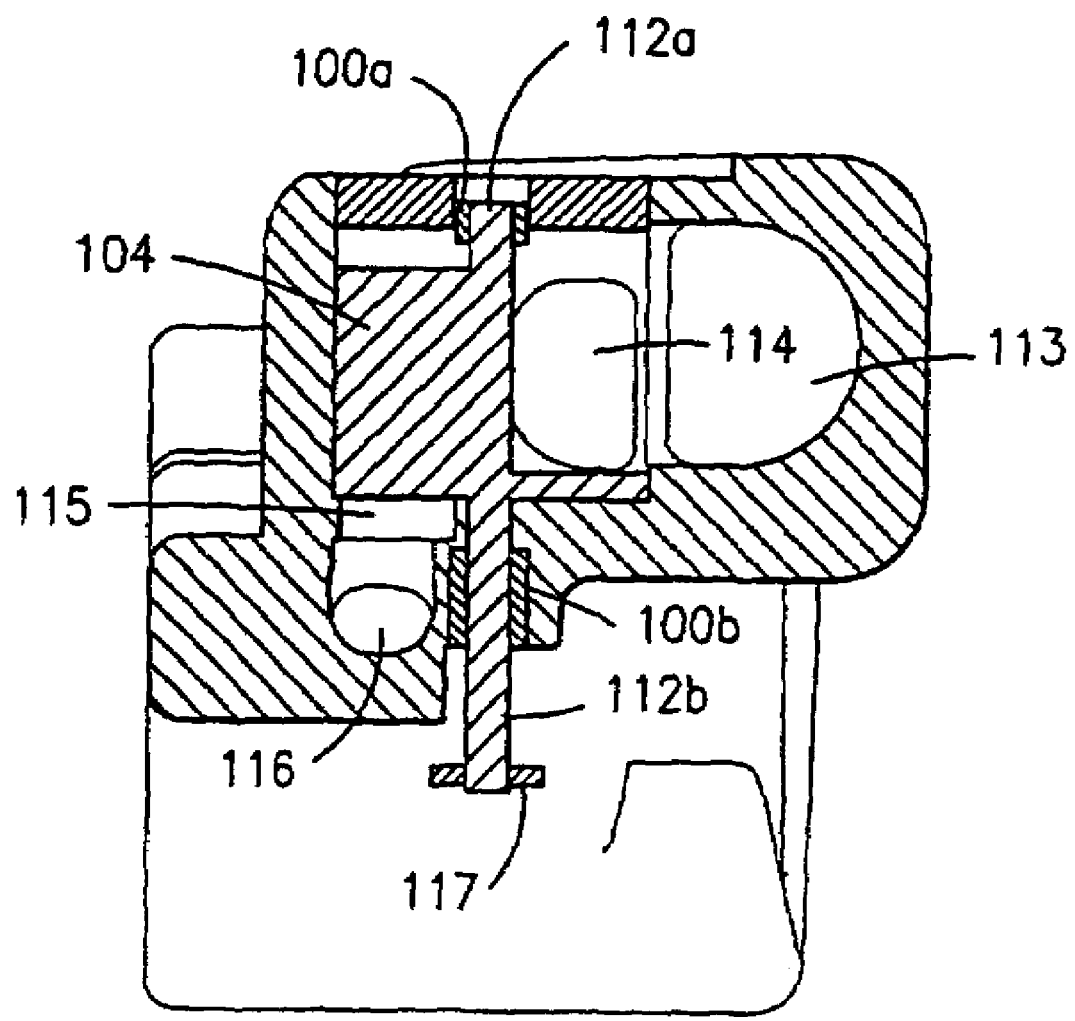
FIG. 10 shows a further alternative of the first embodiment, wherein the bypass channel is not positioned below the first and second flow channels.

A preferred embodiment of the invention is shown in FIG. 10. Here, the bypass channel is not positioned below the first and second flow channels, but is positioned on the other side of the valve shaft (as shown in the figure) from the inner and outer scrolls.

A further alternation in FIG. 10 is that the rotary valve is mounted not on one end but at both ends of the valve. That is, lower shaft 112b is mounted in lower bushing 110b, and upper shaft 112a is mounted in upper bushing 110a. Dual journaling results in a greater precision in the guidance of the valve. This in turn makes it possible to manufacture the valve with closer tolerances, which in turn results in less bypass leakage and greater efficiency, and also in the ability to reduce the size of the valve.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,

What is claimed is:

1. A turbocharger comprising:
    a turbine wheel (9);
    a turbine casing (8) defining a turbine wheel chamber having a wheel chamber inlet port and an outlet port, said turbine casing further including:
        at least one casing inlet port (10) for receiving exhaust gas,
        at least first and second scroll passages (13, 14) open toward an inlet port of a turbine wheel chamber and dimensioned for directing exhaust gas flow from said casing inlet port to said turbine wheel chamber,
        at least one upstream casing outlet upstream of said turbine wheel,
        at least one downstream casing outlet downstream of said turbine wheel for discharging exhaust gas from said turbine wheel chamber; and
    a rotary control valve (1) provided between said casing inlet and said at least first and second scroll passages, said rotary control valve rotatable between (a) a position at which at least one scroll passage is blocked and said upstream casing outlet is blocked, (b) a position at which no scroll is blocked and said upstream casing outlet is blocked, and (c) a position at which no scroll passage is blocked and said upstream casing outlet is not blocked,
    wherein said control valve is rotatable about a central axis, said valve including a disk-shaped base (2) and a control surface (4) provided upon said base, said control surface for selectively blocking or exposing at least one of said first and second scroll passages, said disk including an aperture (7) which can be positioned in registry with said outlet upstream of said turbine wheel for permitting exhaust gas flow to bypass said turbine wheel (9).

2. A turbocharger as in claim 1, wherein said first scroll passage is larger in cross-section than said second scroll passage.

3. A turbocharger as in claim 1, wherein said first scroll passage opens into the turbine wheel chamber via an opening which is larger than the opening with which the second scroll passage opens into the turbine wheel chamber.

4. A turbocharger as in claim 1, wherein said rotary valve control surface (4) is in the form of a sharp wedge, a blunted wedge, or a hyperbolic curve.

5. A turbocharger as in claim 1, wherein said control surface (4) includes a leading edge (5) which extends over the axis of rotation of the rotary valve, and an arcuate trailing edge (6) concentric with said axis of rotation and adapted for passing with close tolerance to the spiral channel inlet openings.

6. A turbocharger as in claim 1, wherein said rotary valve includes a shaft (112a, 112b) extending from opposite sides of said rotary valve (1), and wherein said shaft is rotatably mounted to said turbine casing (8) via said shaft at said opposite sides of said rotary valve.

7. A turbocharger as in claim 1, wherein said opening into said turbine wheel chamber extends approximately once around said turbine wheel.

8. A turbine according to claim 1, wherein the width of said opening into said turbine wheel chamber is constant substantially over the full length of said opening.

9. A turbine according to claim 1, wherein said first and second scroll passages are divided by a partition wall substantially normal to the axis of said turbine wheel.

10. A turbocharger comprising:
  a turbine wheel (9);
  a turbine casing (8) defining a turbine wheel chamber having a wheel chamber inlet port and an outlet port, said turbine casing further including:
    at least one casing inlet port (10) for receiving exhaust gas,
    at least first and second scroll passages (13, 14) respectively open toward an inlet port of a turbine wheel chamber and dimensioned for directing exhaust gas flow from said casing inlet port (10) to said turbine wheel chamber,
    at least one upstream casing outlet upstream of said turbine wheel,
    at least one downstream casing outlet downstream of said turbine wheel for discharging exhaust gas from said turbine wheel chamber; and
  a rotary valve (1) provided between said casing inlet and said at least first and second scroll passages (13, 14), said rotary control valve (1) rotatable between (a) a position at which at least one scroll passage is blocked and said upstream casing outlet is blocked, (b) a position at which no scroll passage is blocked and said upstream casing outlet is blocked, and (c) a position at which no scroll passage is blocked and said upstream casing outlet is not blocked,
  wherein said rotary valve (1) is rotatable about a central axis, said valve including a disk-shaped base (2) and a control surface provided upon said base (4), said control surface dimensioned for selectively blocking at least one of said first and second scroll passages and said upstream casing outlet.

11. A turbocharger as in claim 10, wherein said first scroll passage is larger than said second scroll passage.

12. A turbocharger as in claim 10, wherein said first scroll passage opens into the turbine wheel chamber via an opening which is larger than the opening with which the second scroll passage opens into the inlet port of a turbine wheel chamber.

13. A turbocharger as in claim 10, wherein said rotary valve control surface is in the form of a sharp wedge, a blunted wedge, or a hyperbolic curve.

14. A turbocharger as in claim 10, wherein said control surface (4) includes a leading edge (5) which extends over the axis of rotation of the rotary valve, and an arcuate trailing edge (6) concentric with said axis of rotation and adapted for passing with close tolerance to the spiral channel inlet openings.

15. A turbocharger as in claim 10, wherein said rotary valve (1) includes a shaft (112a, 112b) extending from opposite sides of said rotary valve, and wherein said shaft is rotatably mounted to said turbine casing (8) via said shaft at said opposite sides of said rotary valve.

16. A turbocharger as in claim 10, wherein said opening into said turbine wheel chamber extends approximately once around said turbine wheel.

17. A turbine according to claim 10, wherein the width of said opening into said turbine wheel chamber is constant substantially over the full length of said opening.

18. A turbine according to claim 10, wherein said first and second scroll passages are divided by a partition wall substantially normal to the axis of said turbine wheel.

* * * * *